United States Patent [19]

Baba

[11] Patent Number: 5,083,566

[45] Date of Patent: Jan. 28, 1992

[54] ULTRASONIC IMAGING APPARATUS

[75] Inventor: Tatsuro Baba, Ootawara, Japan

[73] Assignee: Kabushiki Kaisha Toshiba, Kawasaki, Japan

[21] Appl. No.: 476,576

[22] Filed: Feb. 7, 1990

[30] Foreign Application Priority Data

Feb. 10, 1989 [JP] Japan .................................. 1-31420

[51] Int. Cl.$^5$ ................................................ A61B 8/00
[52] U.S. Cl. .................................. 128/660.05; 358/112
[58] Field of Search ......... 128/660.05, 661.08–661.10;
358/112; 73/861.25; 367/103

[56] References Cited

U.S. PATENT DOCUMENTS

| 4,612,937 | 9/1986 | Miller | 128/661.09 |
| 4,817,617 | 4/1989 | Takeuchi et al. | 128/661.09 X |
| 4,930,514 | 6/1990 | Baba et al. | 128/661.09 |

Primary Examiner—Francis Jaworski
Attorney, Agent, or Firm—Finnegan, Henderson, Farabow, Garrett and Dunner

[57] ABSTRACT

An ultrasonic imaging apparatus comprising a memory circuit for storing CFM image data, a controller for reading the same CFM image data several times from the memory circuit in synchronism with the sync signal of a TV monitor, and a smoothing circuit for weighting the CFM image data read out by the controller to perform linear interpolation of the CFM image data, thereby smoothing CFM image data along the time axis.

16 Claims, 9 Drawing Sheets

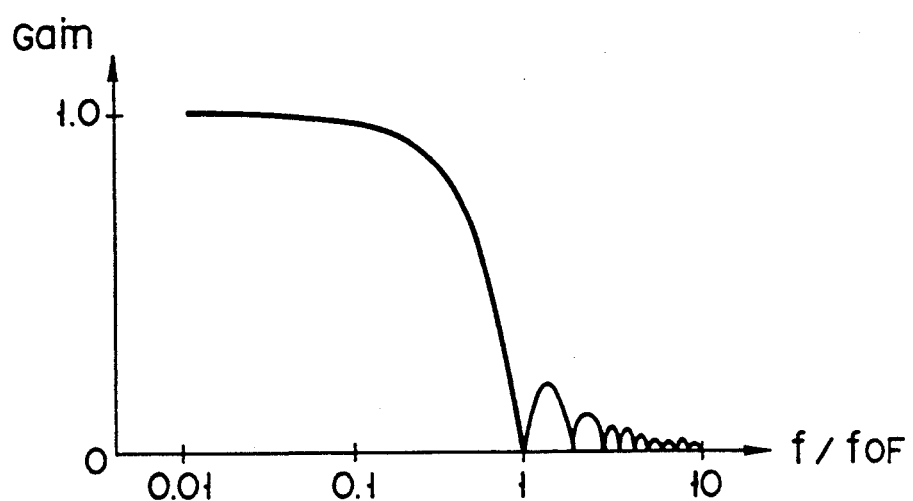
F I G. 6
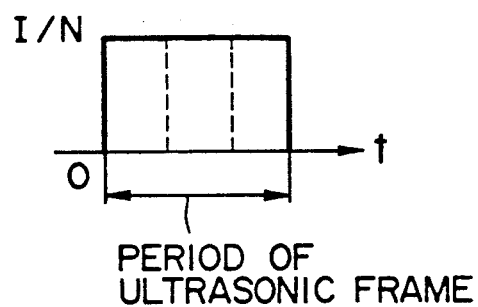
F I G. 7

| VALUES OF NEW DATA AND FM OLD DATA | VALUE OF \|FM NEW DATA - FM OLD DATA\| | GRADATION INTERPOLATION BETWEEN FRAMES |
|---|---|---|
| SAME SIGN | ✕ | LINEAR INTERPOLATION OF FM NEW DATA AND FM OLD DATA |
| DIFFERENT SIGN | \|DIFFERENCE\| < TH | |
| | \|DIFFERENCE\| ≥ TH | INTERPOLATION OF FM DATA AND FM OLD DATA TOWARD HIGH-GRADATION SIDE |

FIG. 9

ULTRASONIC IMAGING APPARATUS

BACKGROUND OF THE INVENTION

1. Field of the Invention

The present invention relates to an ultrasonic blood flow imaging apparatus which utilizes the ultrasonic Doppler effect to acquire blood flow information of the inside of a body to be examined, or a target body, and displays this information as a two-dimensional image.

2. Description of the Related Art

An ultrasonic blood flow imaging apparatus, used together with the ultrasonic Doppler method and pulse echo method, generates blood flow data and tomographic image (B mode) data by means of a single ultrasonic probe and supplies both data, superimposed one on another, to a monitor to provide color display of a superimposed image of the blood flow profile and tomographic image on the monitor.

This ultrasonic blood flow imaging is based on the following principle.

When an ultrasonic beam is irradiated onto a living body in which blood is flowing, the intermediate frequency fc of this beam is disturbed by flowing blood cells, and the intermediate frequency is shifted by frequency fd due to the resultant Doppler effect. The frequency f of the ultrasonic echo having received the Doppler effect becomes f=fc+fd. The frequencies fc and fd are expressed by the following equation:

$$fd = 2v \cdot \cos\theta / c \cdot fc \quad (1)$$

where v is the blood velocity, $\theta$ is an angle defined by the ultrasonic beam and a blood vessel, and c is the speed of sound.

Accordingly, the blood velocity v can be attained by detecting the Doppler shift frequency fd.

In measuring the blood velocity using the Doppler effect as described above, radiation of an ultrasonic pulse in a given direction on a living body from an ultrasonic transducer is repeated several times. Ultrasonic echoes from the living body that have undergone the Doppler effect are received by the ultrasonic transducer and are sequentially converted into echo signals. The echo signals are input to a phase detector to detect a Doppler shift signal. In this case, Doppler shift signals are detected for, for example, 256 sampling points in the raster direction (depth direction of a target body). The Doppler shift signal detected for each sampling point is subjected to frequency analysis in a frequency analyzer, and is converted into a scan signal by a DSC (Digital Scan Converter) to be two-dimensionally displayed as a color flow mapping (CFM) image on a monitor.

In displaying the Doppler shift signal as a CFM image on the monitor, the mean blood velocity is expressed in terms of an angle ($+\pi$ to $-\pi$) or a frequency ($+fr/2$ to $-fr/2$). The range of these angular and frequency expressions corresponds to a color range, namely, blue to red with black in between. The term fr is the rate frequency of an ultrasonic pulse.

According to conventional apparatuses, smoothing of a CFM image on the time axis (persistence), or time smoothing of the CFM image, is executed, as shown in FIG. 10. In FIG. 10, X(s) indicates an input signal, Y(s) an output signal, $$G(s) = \frac{Y(s)}{X(s)}$$

is a transfer function of a prior system for time-smoothing the image, CFM is a differential operator, a is a coefficient, TOF is a one-frame period of the CFM image, $f_{OF}$ is a frequency of one frame of the CFM image, and f is a frequency according to the variation of the graduation of the input signal X(s). The time smoothing is a method to correlate data at the same coordinates (x, y) in a case where a plurality of sequential CFM images are formed for one frame period ($T_{OF}$). A circuit for executing this processing is, theoretically a cyclic digital filter, and is, physically a low-pass filter along the time axis. The effect of using this filter is illustrated in FIG. 11. With $f_{OF}$ being the frame frequency of a CFM image and f being a change in data between adjoining frames, when $f/f_{OF} > 1/2$ is satisfied, gradation change or an aliasing phenomenon occurs. Unless the frame frequency $f_{OF}$ is sufficiently greater than the change f in image data, not only is there no smoothing effect, but also the accurate image data sharply changes, thus providing an improper or undesired image.

SUMMARY OF THE INVENTION

Accordingly, it is an object of this invention to provide an ultrasonic imaging apparatus which has an improved smoothing characteristic to form a CFM image desirable for diagnostic use.

According to one aspect of this invention, there is provided an ultrasonic imaging apparatus, comprising a memory circuit for storing CFM image data, a first controller for reading the same CFM image data for several TV frames from the memory circuit in synchronism with the period of one screen of a TV monitor, and a smoothing circuit for performing a linear interpolation of the CFM image data read out by the first controller to smooth a CFM image along the time axis.

According to another aspect of this invention, there is provided an ultrasonic imaging apparatus, further comprising a second controller for detecting CFM image data exceeding $+fr/2$ or $-fr/2$ where fr is an ultrasonic rate frequency, thereby executing an interpolating process in such a way as to cause the linear interpolation in the smoothing circuit not to cross a zero value of the frequency.

The first controller fetches the same CFM image data a plurality of times from the memory circuit in synchronism with a sync signal of a TV monitor, to obtain the image data of several frames. This data is sent to the smoothing circuit where it undergoes linear interpolation for data smoothing. This processing gently changes the gradation value of an image displayed on the TV monitor to thereby make the transitional points of the gradation change in displaying a CFM dynamic image smoother. When CFM image data exceeding $+fr/2$ or $-fr/2$ is input, the second controller controls the smoothing circuit so that the latter circuit performs a linear interpolation of the CFM image data in such a direction as to cause the result of the interpolating process not to cross a zero frequency. Therefore, even if the aliasing phenomenon occurs, black framing will not appear on a displayed image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 4 through 7 are diagrams for explaining the effects of the smoothing process executed in this invention;

FIG. 9 is a diagram for explaining an interpolation carried out for the aliasing phenomenon;

DETAILED DESCRIPTION OF THE PREFERRED EMBODIMENTS

Figure 1:
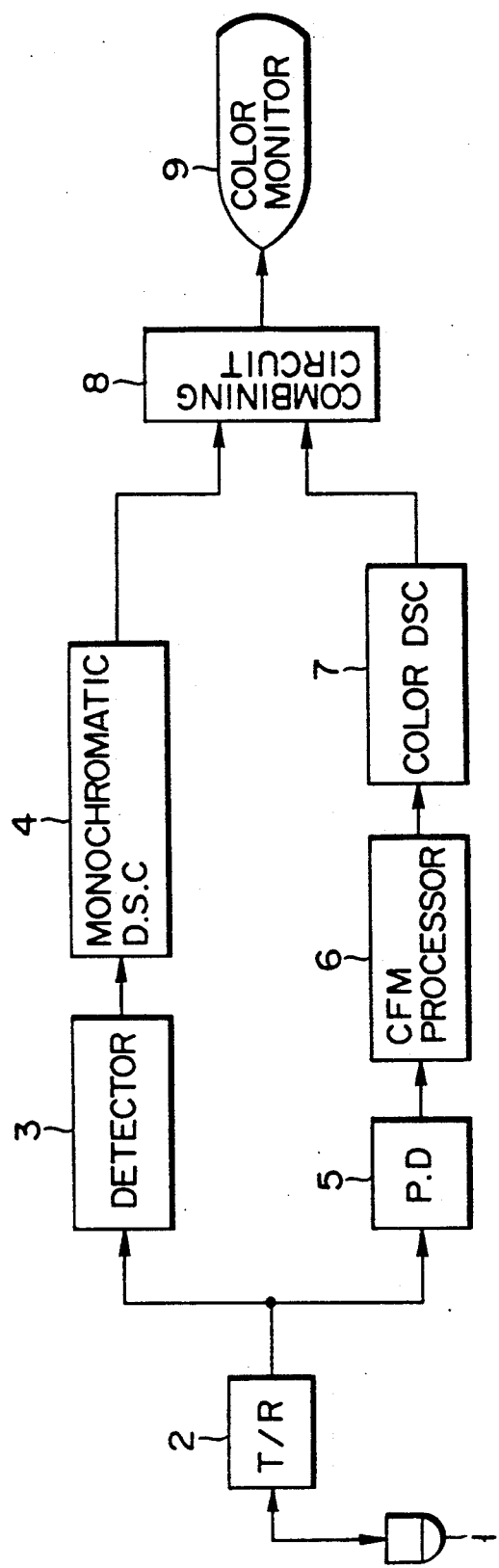
FIG. 1 is a block circuit diagram of an ultrasonic imaging apparatus according to one embodiment of the present invention.

Referring to FIG. 1, an ultrasonic probe 1 having a plurality of ultrasonic transducer elements arranged in array is coupled to a transmitter/receiver circuit 2. This transmitter/receiver circuit 2 drives and controls the ultrasonic probe 1 to generate an ultrasonic pulse and receive an ultrasonic pulse echo and outputs an echo signal. The transmitter/receiver circuit 2 has its output terminal coupled to an input terminal of a detector 3 which detects the envelope of the echo signal. The detector 3 has its output terminal coupled to an input terminal of a monochromatic (black and white) DSC 4 which converts the detected echo signal into a TV signal. The monochromatic DSC 4 has its output terminal coupled to a combining circuit 8.

The transmitter/receiver 2 also has its output terminal coupled to an input terminal of a phase detector 5 which detects the phase of an ultrasonic echo signal to acquire an ultrasonic Doppler shift data or blood flow data of a target body. The phase detector 5 has its output terminal coupled to an input terminal of a CFM processor 6. This CFM processor 6 converts the blood flow data from the phase detector 5 into a color flow mapping (CFM) signal. The CFM processor has its output terminal coupled to an input terminal of a color DSC 7 which converts the CFM signal into a TV color signal.

The output terminals of both monochromatic DSC 4 and color DSC 7 are coupled to an input terminal of the combining circuit 8. This circuit 8 combines a B mode monochromatic signal from the DSC 4 and a CFM signal (blood flow information signal) from the DSC 7 and outputs the resultant combination on a color monitor 9.

Figure 2:
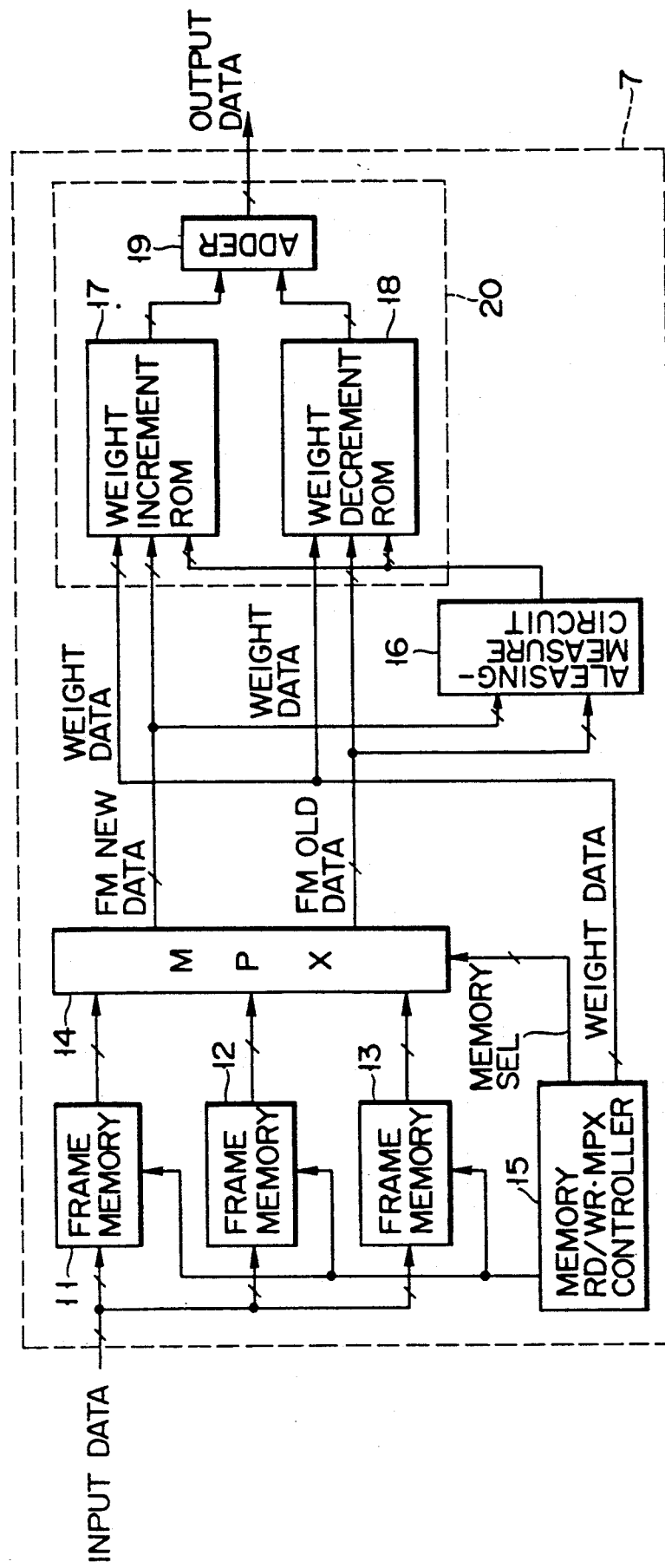
FIG. 2 is a block circuit diagram of a color DSC shown in FIG. 1.

The color DSC 7 is constituted as shown in FIG. 2. As illustrated, the color DSC 7 has a memory circuit or a plurality of frame memories 11, 12 and 13, which are coupled to the output terminal of the CFM processor 6 and store CFM image data. Readout terminals of these frame memories 11 to 13 are coupled to an input terminal of a multiplexer (MPX) 14 which selects image data from the frame memories.

The frame memories 11–13 and multiplexer 14 are controlled by a memory RD/WR . MPX controller 15. The controller 15 fetches the same CFM image data a plurality of times, e.g. three times, as shown in FIG. 3, from the frame memories 11–13 in synchronism with a sync signal of one screen of the color monitor 9, to obtain the image data of several frames. The controller 15 outputs a memory select signal to the multiplexer 14 so that the multiplexer 14 selects image data output from two of the frame memories 11–13 in response to the memory select signal and outputs the selected image data as new data (FM new data) and 1-frame old data (FM old data).

The new and old data output terminals of the multiplexer 14 are coupled to a weight increment ROM 17 and a weight decrement ROM 18 both of a smoothing circuit 20. The former ROM 17 has a table for weighting the new data from the multiplexer 14 to output INC data, and the latter ROM 18 likewise has a table for weighting the old data from the multiplexer 14 to output DEC data. The ROMs 17 and 18 have their output terminals coupled to an input terminal of an adder 19. The adder 19 adds the outputs of the ROMs 17 and 18 and outputs the added output as smoothing output data originating from linear interpolation to the combining circuit 8.

The CFM processor 7 includes an aliasing-measure circuit 16. This circuit 16 detects CFM image data which exceeds $+fr/2$ or $-fr/2$ and outputs an aliasing control signal to the weight increment and decrement ROMs 17 and 18. This aliasing control signal alters the tables of the ROMs 17 and 18 so that an interpolating process is switched to one which does not cause the linear interpolation in the smoothing circuit 20 to cross a zero frequency.

The operation of the above ultrasonic imaging apparatus will be described below.

Referring to FIG. 1, when the transmitter/receiver 2 outputs a drive pulse for sector scanning, for example, to the ultrasonic probe 1 in order to attain a B mode image, the ultrasonic probe 1 radiations an ultrasonic pulse to a target body to execute sector scanning of the body and receives an ultrasonic pulse echo from the body. Upon reception of an echo signal corresponding to an echo from the ultrasonic probe 1, the transmitter/receiver circuit 2 subjects the echo signal to signal processing such as amplification and delay processing, and sends its output signal to the detector 3. The detector 3 detects an envelope of the received signal and outputs a detection signal to the monochromatic DSC 4. This DSC 4 in turn converts the detection signal into a monochromatic B mode image signal and outputs it to the combining circuit 8.

When the transmitter/receiver circuit 2 outputs a drive pulse for acquiring Doppler data to the ultrasonic probe 1, the probe 1 radiates an ultrasonic pulse in each raster direction several times and receives echoes for the repeated number of pulse radiations. The transmitter/receiver circuit 2 amplifies the echo signal and outputs the resultant signal to the phase detector 5. The phase detector in turn detects the envelope of the received echo signal and outputs the detection signal to the CFM processor 6. The CFM processor 6 analyzes the frequency of the received detection output to acquire blood flow data such as V (mean blood velocity), P (total power), and σ (variance), and sends the blood flow information as CFM image data to the color DSC 7.

The CFM image data is written in the frame memories 11, 12 and 13 in the color DSC 7, as shown in FIG. 2. The data writing is executed by a write enable signal from the controller 15 in synchronism with sector scanning with an ultrasonic beam, as illustrated in the timing chart in FIG. 3A. In this case, while the input image data is being written in one of the three frame memories 11-13, the other frame memories stay in read mode. In data read mode, the stored image data is read out from the associated frame memories in synchronism with a TV sync signal. That is, sampling data is converted into a TV signal. The timing for such data reading is determined by the TV sync enable signal output from the controller 15.

Each screen of a B mode ultrasonic image is formed by several tens to several hundreds of ultrasonic beams or in the period of ultrasonic scanning raster (ultrasonic pulse repeating period). One frame of a TV image, by way of contrast, is formed in the period of about 500 to 600 TV horizontal scanning lines. In order to attain CFM image data from Doppler data, one screen of a CFM image is formed in the period of about several hundreds of milliseconds, this period is significantly longer than the one-frame period for a TV image, i.e., 40 or 33 milliseconds. When an ultrasonic image is displayed on a TV monitor in such a state of different periods, the linking portion of ultrasonic scanned images becomes prominent and the image quality deteriorates. To overcome the shortcoming, according to this invention, N times the one-frame period of a TV image is determined as a one-frame period for an ultrasonic image. That is, $N \cdot$ (period for one TV frame) $\geq$ (period for one ultrasonic frame) $> (N - 1) \cdot$ (period for one TV frame)

$N \cdot$ (period for one TV frame) $=$ (period for one ultrasonic frame) $+$ (scanning stop period).

Figure 3A:
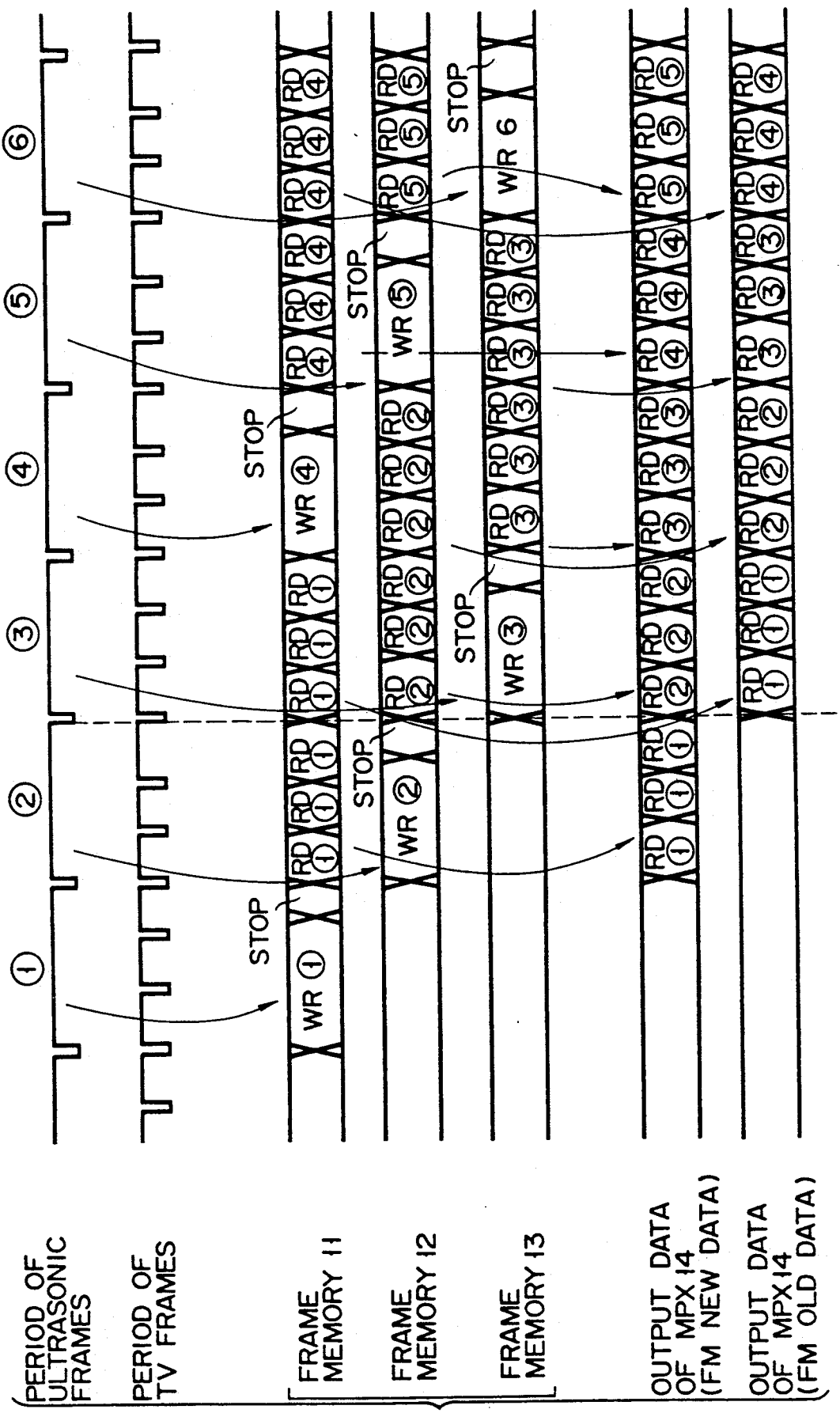
FIGS. 3A and 3B show a timing chart for explaining the operation of the color DSC shown in FIG. 2.

The CFM image data is sequentially written in the frame memories 11-13 in synchronism with the period for one ultrasonic frame, and the written CFM image data is read out in synchronism with a TV sync signal. The fetched data is selected by the multiplexer 14 before being input to the smoothing circuit 20. In this circuit 20, the latest fetched CFM image data, or FM new data, and 1-period old CFM image data, or FM old data, are respectively input to the weight increment ROM 17 and the weight decrement ROM 18. The FM new data and FM old data are weighted by weighting factors stored in the ROMs 17 and 18. In this case, the weighting factors are incremented and decremented by weight control data from the controller 15, as shown by the following equations and as shown in FIGS. 3A and 3B:

Increment: 0/N, 1/N, ..., (N−1)/N

Decrement: N/N, (N−1)/N, ..., 1/N.

Figure 3B:
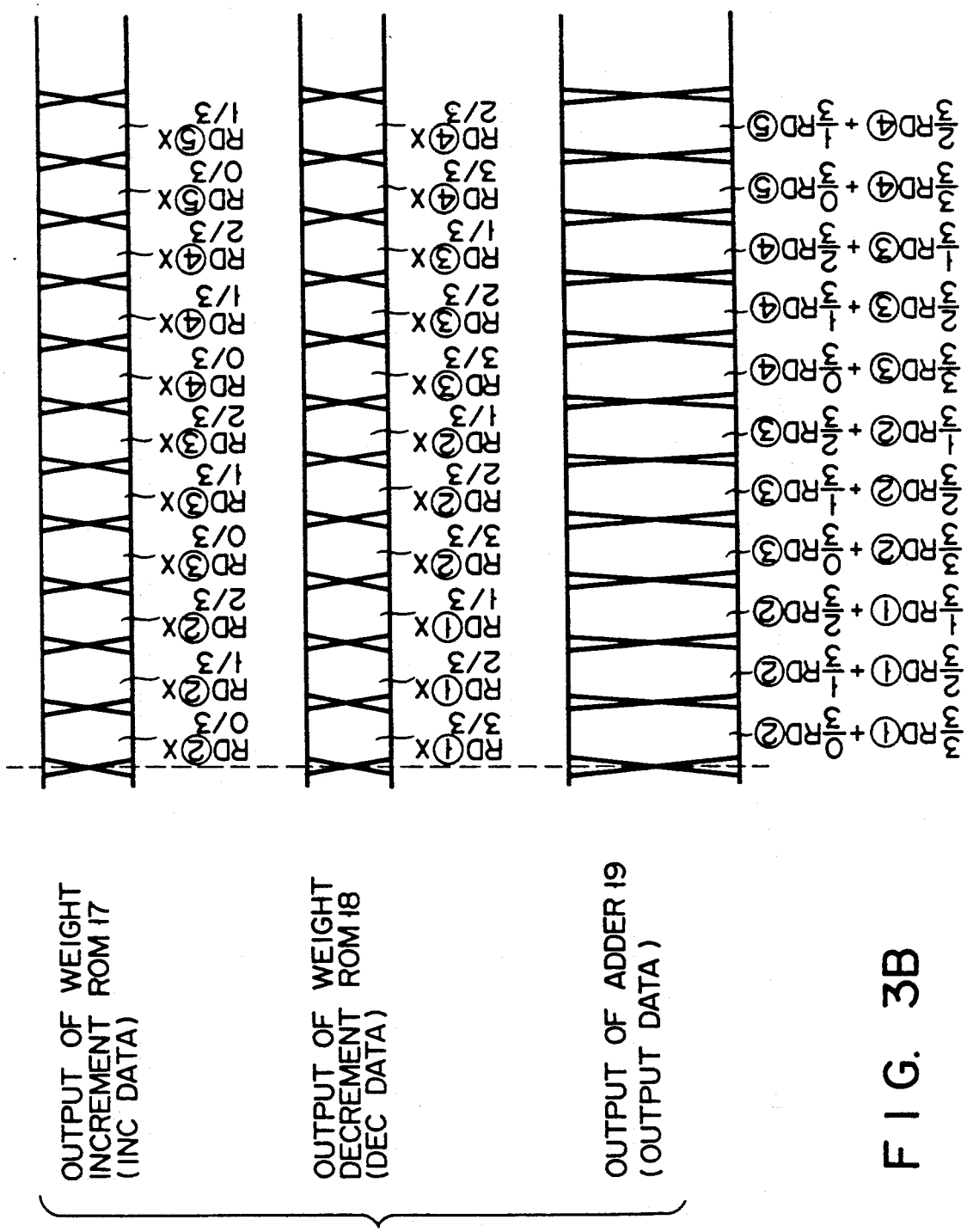

These weighting factors, e.g. increment weighting factors 0/3, 1/3 and 2/3, decrement weighting factors 3/3, 2/3 and 1/3, are applied to the FM new data and FM old data, as shown in FIG. 3B. That is, the tables representing the correlation of the FM new data and old data and the weighting factors are stored in the ROM 17 and 18.

The weighted FM new data and FM old data are input as INC data and DEC data to the adder 19 for addition. The added data from the adder 19 serves as linear interpolation data between frames or smoothing data. This smoothing data is sent to the combining circuit 8.

Figure 4:
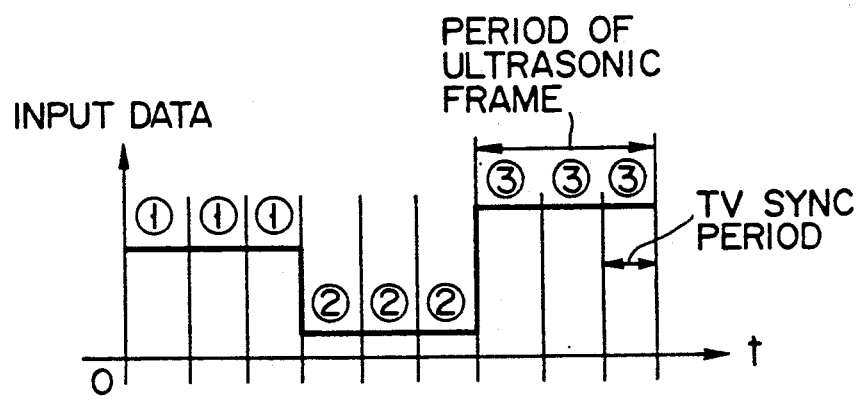
Figure 5:
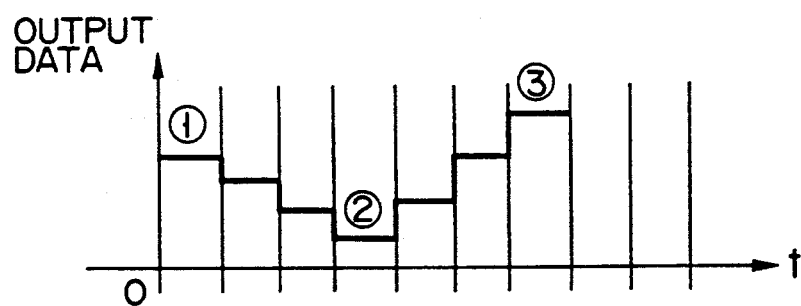

Through the above smoothing process, for example, stepwise input data as shown in FIG. 4 (input data changing stepwise in association with N times the period of the TV sync signal) is converted into smoothing output data having a gently-changing waveform as shown in FIG. 5. As a result, a dynamic image obtained by this smoothing output data has a smooth gradation change.

As described above, the physical effect of the smoothing process is to provide a smoothing characteristic (frequency response to gradation change) as shown in FIG. 6, so that the resultant image, unlike an image obtained by frame correlation (see FIG. 4), has no aliasing phenomenon occurring under the condition of $f/f_{OF} \geq 1/2$. This effect is equivalent to the effect obtained by convolution of the stepwise waveform (peak: 1/N) shown in FIG. 7 on the waveform shown in FIG. 4 along the time axis. This convolution calculation is easily performed by the smoothing circuit 20 shown in FIG. 2.

A measure for the aliasing phenomenon will now be described.

Since the sampling in the sampling system in the ultrasonic imaging apparatus is discrete sampling according to fr (rate frequency of ultrasonic pulse), the CFM processor 6 in FIG. 1 can analyze the frequency only in a range of $+fr/2$ to $-fr/2$. If image data exceeding $+fr/2$ is generated, the aliasing phenomenon occurs and black framing appears at those portions of the CFM image displayed by red and blue gradations where transition of bright red to bright blue and transition of bright blue to bright red occur. As this black framing is misinterpreted as having no data, it is undesirable. According to this invention, therefore, the aliasing-measure circuit 16 is provided in the color DSC 7. This circuit 16 controls linear interpolation of CFM image data executed by the smoothing circuit 20 in such a manner that the linear interpolation does not cross a zero frequency, thus preventing possible occurrence of black framing.

Figure 8:
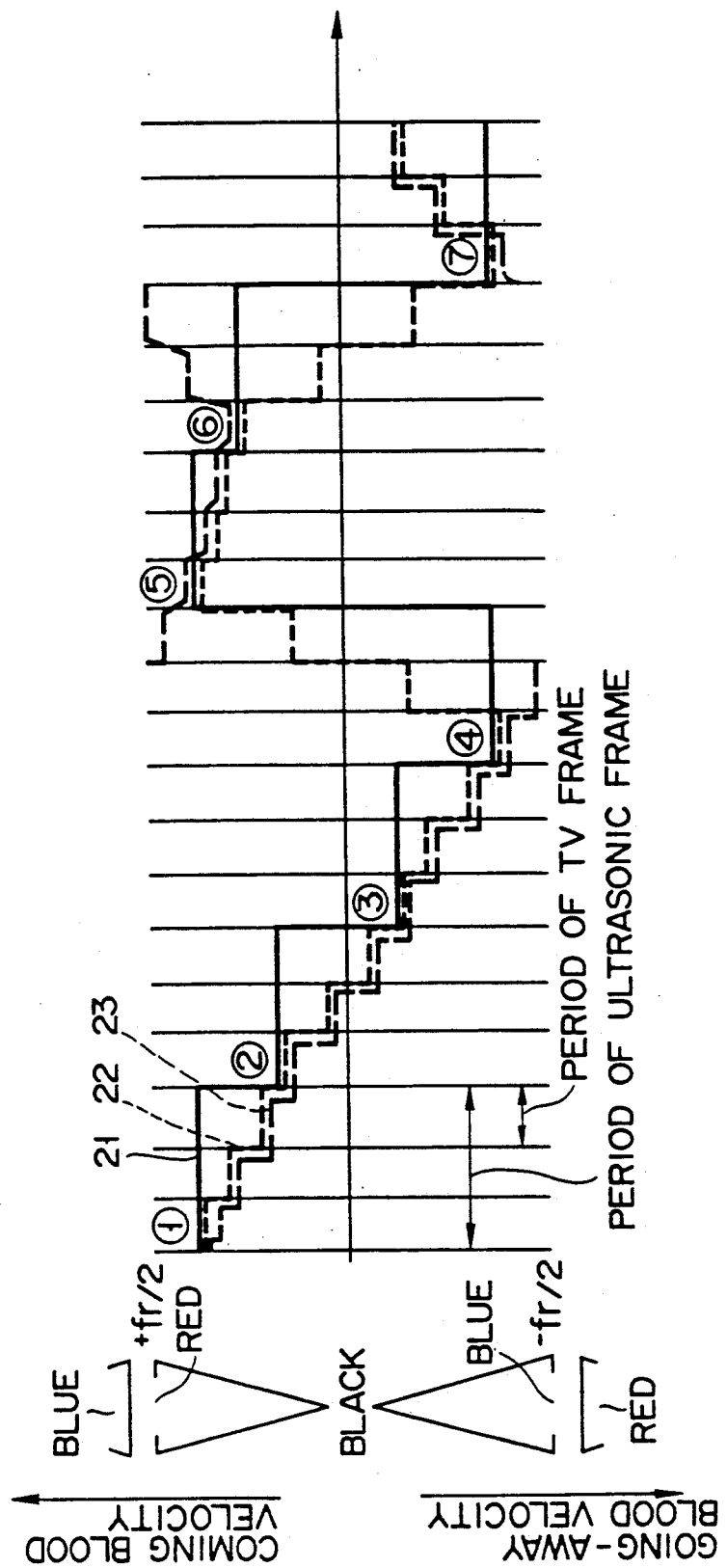
FIG. 8 is a diagram for explaining the effect provided when a measure is taken for the aliasing phenomenon.
Figure 10:
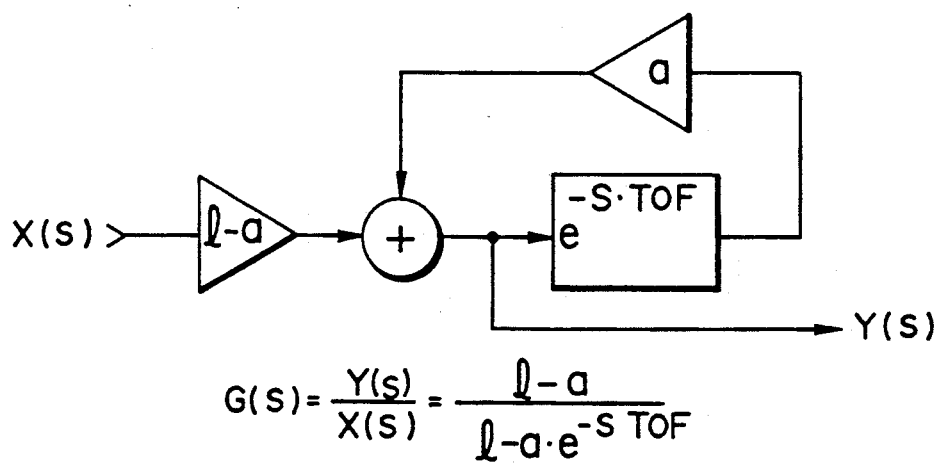
FIG. 10 is a circuit diagram of a filter for smoothing the CFM image data.
Figure 11:
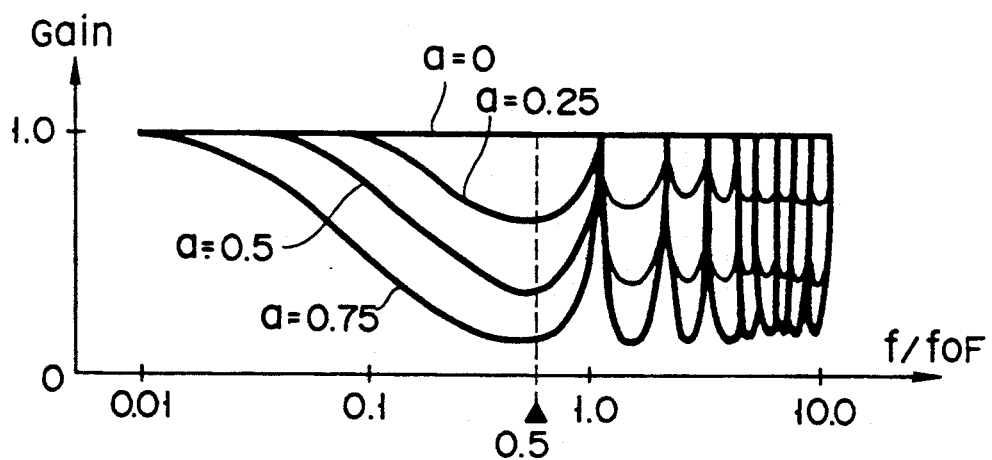
FIG. 11 is a diagram for illustrating the effect of the prior smoothing method.

Referring to FIG. 8, the aliasing-measure circuit 16 discriminates the signs of the FM new data and FM old data from the multiplexer 14 and discriminates which is greater, the absolute value of the difference between these data or a threshold value TH. If |difference| $\geq$ TH, i.e., if the aliasing phenomenon has occurred, the aliasing-measure circuit 16 sends aliasing control data to the smoothing circuit 20. In response to the received control data, the circuit 20 changes the weighting factor tables of the weight increment ROM 17 and weight decrement ROM 18. The table alteration permits the linear interpolation in such a direction that the interpolation does not cross the zero frequency. In other words, interpolation is shifted on the high gradation side. The interpolation toward the high-gradation side is executed as follows.

With DN being FM new data and $D_O$ being FM old data, for example, the output of interpolation between frames between these data takes a value of the following equation when $D_O+D_O \geqq =0$:

$$-fr/2+(D_O+D_O)/2.$$

When the FM new data $D_N$ and FM old data $D_O$ have the relation of $D_N+D_O >0$, the interpolation output takes a value of the following equation: $fr/2+(D_N+D_O)/2$.

The interpolation data obtained by the above equations are stored as tables in the ROMs 17 and 18.

The effect of taking the aliasing measure will be described below referring to FIG. 8.

A curve 21 indicates a gradation change when no smoothing process is performed. Although data 5 and 6 are originally smaller than $-fr/2$, gradation is aliased to a value slightly smaller than $+fr/2$ due to the limited frequency analyzing performance of the CFM processor 6. In this case, a CFM image is displayed as bright blue→(bright red)→bright blue.

A curve 22 indicates a gradation change when a smoothing process is performed on image data but no aliasing measure is taken for the same data. In this case, in the stages of 4→5 and 6→7, the gradation changes from blue to black to bright red and from bright red to black to bright blue, from which it should be obvious that black framing originating from the aliasing phenomenon occurs when the smoothing process along the time axis is performed.

A curve 23 indicates a gradation change in a case where a smoothing process is performed with an aliasing measure being taken under the interpolation conditions shown in FIG. 9. In this case, in the stages of 4→5 and 6→7, the gradation changes from bright blue to bright red and from bright red to bright blue, and no black framing originating from the aleasing phenomenon is caused. This can provide a good blood flow distribution image proper for diagnostic purposes, and this invention is particularly effective in finding a blood flow in a liver cancer by means of low-frame ultrasonic scanning.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. An ultrasonic imaging apparatus, comprising:
   ultrasonic transducer means for radiating an ultrasonic pulse onto a target body, for receiving an ultrasonic pulse echo from said target body, and for outputting an echo signal corresponding to said ultrasonic pulse echo;
   color flow mapping (CFM) means for receiving said echo signal and for forming a plurality of successive ultrasonic frames of CFM image data from said echo signal, each ultrasonic frame representing a two dimensional CFM image;
   memory means including a plurality of frame memories, each frame memory storing CFM image data for one ultrasonic frame;
   controlling means for generating a TV sync signal and for repeatedly reading the same CFM image data from at least two of said frame memories in synchronism with said TV sync signal; and
   smoothing means for linearly interpolating CFM image data read from one of said frame memories for one ultrasonic frame with CFM image data read from another of said frame memories for a subsequent ultrasonic frame to smooth said CFM image data between adjacent ultrasonic frames.

2. The ultrasonic imaging apparatus according to claim 1, wherein said smoothing means comprise:
   weighting means for weighting said CFM image data read from said frame memories in synchronism with said TV sync signal and in accordance with a plurality of weighting factors, said weighting factors having sequential values; and
   adding means for adding said weighted CFM image data to produce smoothing data to smooth said CFM image data.

3. The ultrasonic imaging apparatus according to claim 2, wherein said weighting factors include incremental and decremental weighting factors, and wherein said smoothing means further comprises storage means for storing said incremental and decremental weighting factors.

4. The ultrasonic imaging apparatus according to claim 3, wherein said storage means comprises a first memory for storing said incremental weighting factors and a second memory for storing said decremental weighting factors.

5. The ultrasonic imaging apparatus according to claim 2, further comprising means for detecting an aliasing of said CFM image data read from said frame memories and for transmitting aliasing control data to said smoothing means to adjust said weighting factors to compensate for said aliasing.

6. The ultrasonic imaging apparatus according to claim 1, wherein said FM means comprises:
   phase detecting means for detecting a phase of said echo signal to acquire ultrasonic Doppler shift data from said echo signal; and
   converting means for converting said ultrasonic Doppler shift data into said CFM image data.

7. The ultrasonic imaging apparatus according to claim 1, wherein said controlling means stores CFM image data into at least one of said frame memories while reading CFM image data stored in at least two other frame memories.

8. The ultrasonic imaging apparatus according to claim 7, wherein said controlling means comprises multiplexer means for reading said CFM image data from selected ones of said frame memories.

9. An ultrasonic imaging apparatus, comprising:
   ultrasonic transducer means for radiating an ultrasonic pulse onto a target body, for receiving an ultrasonic pulse echo form said target body, and for outputting an echo signal corresponding to said ultrasonic pulse echo;
   means for driving said ultrasonic transducer means in a B mode and a Doppler mode;
   means for forming B mode image data from said echo signal;
   color flow mapping (CFM) means for receiving said echo signal and for forming a plurality of successive ultrasonic frames of CFM image data from said echo signal, each ultrasonic frame representing a two dimensional CFM image;

memory means including a plurality of frame memories, each frame memory storing CFM image data for one ultrasonic frame;

controlling means for generating a TV sync signal and for repeatedly reading the same CFM image data from at least two of said frame memories in synchronism with said TV sync signal;

smoothing means for linearly interpolating CFM image data read from one of said frame memories for one ultrasonic frame with CFM image data read from another of said frame memories for a subsequent ultrasonic frame to smooth said CFM image data between adjacent ultrasonic frames;

combining means for combining said linearly interpolated CFM image data and said B mode image data into combined image data; and display means for displaying a B mode image and a color CFM image in accordance with said combined image data.

10. The ultrasonic imaging apparatus according to claim 9, wherein said smoothing means comprises:

weighting means for weighting said CFM image data read from said frame memories in synchronism with said TV sync signal and in accordance with a plurality of weighting factors, said weighting factors having sequential values; and adding means for adding said weighted CFM image data to produce smoothing data to smooth said CFM image data.

11. The ultrasonic imaging apparatus according to claim 10, wherein said weighting factors include incremental and decremental weighting factors, and wherein said smoothing means further comprises storage means for storing said incremental and decremental weighting factors.

12. The ultrasonic imaging apparatus according to claim 11, wherein said storage means comprises a first memory for storing said incremental weighting factors and a second memory for storing said decremental weighting factors.

13. The ultrasonic imaging apparatus according to claim 10, further comprising means for detecting an aliasing of said CFM image data read from said frame memories and for transmitting aliasing control data to said smoothing means to adjust said weighting factors to compensate for said aliasing.

14. The ultrasonic imaging apparatus according to claim 9, wherein said CFM means comprises:

phase detecting means for detecting a phase of said echo signal to acquire ultrasonic Doppler shift data from said echo signal;

and converting means for converting said ultrasonic Doppler shift data into said CFM image data.

15. The ultrasonic imaging apparatus according to claim 9, wherein said controlling means stores CFM image data into at least one of said frame memories while reading CFM image data stored in at least two other frame memories.

16. The ultrasonic imaging apparatus according to claim 15, where said controlling means comprises multiplexer means for reading said CFM image data from selected ones of said frame memories.

* * * * *

UNITED STATES PATENT AND TRADEMARK OFFICE
CERTIFICATE OF CORRECTION

PATENT NO. : 5,083,566
DATED : January 28, 1992
INVENTOR(S) : TATSURO BABA

It is certified that error appears in the above-identified patent and that said Letters Patent is hereby corrected as shown below:

Claim 2, column 8, line 15, change "comprise" to --comprises--.

Claim 6, column 8, line 42, change "FM" to --CFM--.

Claim 9, column 8, line 60, change "form" to --from--.

Signed and Sealed this

Twenty-ninth Day of June, 1993

MICHAEL K. KIRK

Attest:

Attesting Officer

Acting Commissioner of Patents and Trademarks